United States Patent
Shibata et al.

(10) Patent No.: US 7,027,508 B2
(45) Date of Patent: Apr. 11, 2006

(54) AV SIGNAL PROCESSING APPARATUS FOR DETECTING A BOUNDARY BETWEEN SCENES, METHOD AND RECORDING MEDIUM THEREFORE

(75) Inventors: Hiromasa Shibata, Kanagawa (JP); Toby Walker, Kanagawa (JP)

(73) Assignee: Sony Corporation, Tokyo (JP)

( * ) Notice: Subject to any disclaimer, the term of this patent is extended or adjusted under 35 U.S.C. 154(b) by 941 days.

(21) Appl. No.: 09/905,049

(22) Filed: Jul. 13, 2001

(65) Prior Publication Data

US 2002/0061136 A1    May 23, 2002

(30) Foreign Application Priority Data

Jul. 14, 2000    (JP)    .............................. 2000-214238
Jun. 6, 2001    (JP)    .............................. 2001-170611

(51) Int. Cl.
*H04N 7/12*    (2006.01)

(52) U.S. Cl. .............................................. 375/240.08
(58) Field of Classification Search ........... 375/240.08; 345/473; 386/125; 715/500.1; H04N 7/12
See application file for complete search history.

(56) References Cited

U.S. PATENT DOCUMENTS

| 5,708,767 A | * | 1/1998 | Yeo et al. | ................. 715/500.1 |
| 6,310,625 B1 | * | 10/2001 | Yoshio et al. | ................ 345/473 |
| 6,400,890 B1 | * | 6/2002 | Nagasaka et al. | ........... 386/125 |

* cited by examiner

*Primary Examiner*—Young Lee
(74) *Attorney, Agent, or Firm*—Frommer Lawrence & Haug LLP; Williams S. Frommer

(57) ABSTRACT

The invention provides an AV signal processing apparatus and method by which a boundary between scenes is detected so that recorded video data can be played back beginning with an arbitrary scene. First, video data inputted is divided into video segments or audio segments or, if possible, into both of video and audio segments. Then, feature amounts representative of features of the segment are calculated, and then, similarity measurement between segments is performed using the feature amounts. Thereafter, it is discriminated whether or not the segment corresponds to a break of a scene. Thus, the video-audio processing apparatus uses the dissimilarity measurement criterion and the feature amounts calculated as above to determine, regarding each segment as the reference segment at present, in which one of the past and the future with respect to the reference segment the ratio of presence of neighboring similar segments is higher, and investigates the pattern of the change of the ratio to discriminate whether or not the reference segment corresponds to a boundary of a scene.

3 Claims, 8 Drawing Sheets

F I G. 8

START
↓
S11 DETECT N SIMILAR SEGMENTS WITH TIME FRAMEWORK T
↓
S12 STORE AS BOUNDARY MEASUREMENT VALUES Fi OF SEGMENTS
↓
S13 PATTERN DISCRIMINATION OF BOUNDARY MEASUREMENT VALUES Fi : NONE OF Fi-n TO Fi+n IS EQUAL TO 0 AND Fi-n TO Fi-1 ARE LOWER THAN 0 WHILE Fi TO Fi+n ARE HIGHER THAN 0 ?
— NO → S16 DISCRIMINATE NOT AS BOUNDARY OF SCENE → END
— YES ↓
S14 CONDITION OF SCENE INTENSITY VALUE Vi SATISFIED ?
— NO → S16
— YES ↓
S15 DISCRIMINATE AS BOUNDARY OF SCENE : OUTPUT SCENE BOUNDARY POSITION
↓
END

AV SIGNAL PROCESSING APPARATUS FOR DETECTING A BOUNDARY BETWEEN SCENES, METHOD AND RECORDING MEDIUM THEREFORE

BACKGROUND OF THE INVENTION

This invention relates to an AV signal processing apparatus and method as well as a recording medium, and more particularly to an AV signal processing apparatus and method as well as a recording medium suitable for use to select and play back a desired portion from a series of a video signal.

It is sometimes desired to search for and play back a desired portion such as an interesting portion from within a video application composed of a large amount of different video data such as, for example, television broadcasts recorded as video data.

One of conventional techniques for extracting desired video contents in this manner is a storyboard which is a panel formed from a series of videos which represent major scenes of an application. The storyboard displays videos representing individual shots into which video data are divided. Almost all of such video extraction techniques automatically detect and extract shots from within video data as disclosed, for example, in G. Ahanger and T. D. C. Little, "A survey of technologies for parsing and indexing digital video", J. of Visual Communication and Image Representation 7, 28-4, 1996.

However, for example, a representative television broadcast for 30 minutes includes hundreds of shots. Therefore, in the conventional video extraction technique described above, a user must check a storyboard on which a very great number of extracted shots are juxtaposed, and when the user tries to recognize the storyboard, a very heavy burden is imposed on the user.

The conventional video extraction technique is further disadvantageous in that, for example, shots of a scene of conversation obtained by imaging two persons alternately depending upon which one of the persons talks include many redundant shots. In this manner, shots are very low in hierarchy as an object of extraction of a video structure and include a great amount of wasteful information, and the conventional video extraction technique by which such shots are extracted is not convenient to its user.

Another video extraction technique uses very professional knowledge regarding a particular contents genre such as news or a football game as disclosed, for example, in A. Merlino, D. Morey and M. Maybury, "Broadcast news navigation using story segmentation", Proc. of ACM Multimedia 97, 1997 or Japanese Patent Laid-Open No. 136297/1998. However, although the conventional video extraction technique can provide a good result in regard to an object genre, it is disadvantageous in that it is not useful to the other genres at all and besides it cannot be generalized readily because its application is limited to a particular genre.

A further video extraction technique extracts story units as disclosed, for example, in U.S. Pat. No. 5,708,767. However, the conventional video extraction technique is not fully automated and requires an operation of a user in order to determine which shots indicate the same contents. The conventional video extraction technique is disadvantageous also in that complicated calculation is required for processing and the object of its application is limited only to video information.

A still further video extraction technique combines detection of shots with detection of a no sound period to discriminate a scene as disclosed, for example, in Japanese Patent Laid-Open No. 214879/1997. The video extraction technique, however, can be applied only where a no sound period corresponds to a boundary between shots.

A yet further video extraction technique detects repeated similar shots in order to reduce the redundancy in display of a storyboard as disclosed, for example, in H. Aoki, S. Shimotsuji and O. Hori, "A shot classification method to select effective key-frames for video browsing", IPSJ Human Interface SIG Notes, 7: 43–50, 1996. The conventional video extraction technique, however, can be applied only to video information but cannot be applied to audio information.

The conventional video extraction techniques described above further have several problems in incorporating them into apparatus for domestic use such as a set top box or a digital video recorder. This arises from the fact that the conventional video extraction techniques are configured supposing that post-processing is performed. More specifically, they have the following three problems.

The first problem resides in that the number of segments depends upon the length of contents, and even if the number of segments is fixed, the number of shots included in them is not fixed. Therefore, the memory capacity necessary for scene detection cannot be fixed, and consequently, the required memory capacity must be set to an excessively high level. This is a significant problem with apparatus for domestic use which have a limited memory capacity.

The second problem resides in that apparatus for domestic use require real-time processing to complete a determined process within a determined time without fail. However, since the number of segments cannot be fixed and post-processing must be performed, it is difficult to always complete a process within a predetermined time. This signifies that, where a CPU (central processing unit) which does not have a high performance and is used in apparatus for domestic use must be used, it is further difficult to perform real time processing.

The third problem resides in that, since post processing is required as described above, processing of scene detection cannot be completed each time a segment is produced. This signifies that, if a recording state is inadvertently stopped by some reason, an intermediate result till then cannot be obtained. This signifies that sequential processing during recording is impossible and is a significant problem with apparatus for domestic use.

Further, with the conventional video extraction apparatus described above, when a scene is to be determined, a method which is based on a pattern of repetitions of segments or grouping of segments is used, and therefore, a result of scene detection is unique. Therefore, it is impossible to discriminate whether or not a boundary detected is an actual boundary between scenes with high possibility, and the number of detected scenes cannot be controlled stepwise.

Further, in order that videos can be seen easily, it is necessary to minimize the number of scenes. Therefore, a problem occurs that, where the number of detected scenes is limited, it must be discriminated what scenes should be displayed. Therefore, if the significance of each scene obtained is determined, then the scenes may be displayed in accordance with the order of significance thereof. However, the conventional video extraction techniques do not provide a scale to be used for measurement of the degree of significance for each scene obtained.

SUMMARY OF THE INVENTION

It is an object of the present invention to provide an AV signal processing apparatus and method as well as a recording medium by which a boundary between scenes is detected so that recorded video data can be played back beginning with an arbitrary scene.

In order to attain the object described above, according to an aspect of the present invention, there is provided an AV signal processing apparatus for detecting and analyzing a pattern which reflects a significance structure of contents of an AV signal supplied thereto to detect a scene of a significant break, including feature amount extraction means for extracting feature amounts of segments each formed from a series of frames which form the AV signal, calculation means for calculating a measurement criterion to be used for measurement of a similarity of the feature amounts between a reference segment and other segments, similarity measurement means for using the measurement criterion to measure the similarity between the reference segment and the other segments, measurement value calculation means for using the similarity measured by the similarity measurement means to calculate a measurement value indicative of a possibility that the reference segment may be a boundary of the scene, and boundary discrimination means for analyzing a variation of a pattern with respect to time of the measurement value calculated by the measurement value calculation means and discriminating based on a result of the analysis whether or not the reference segment is the boundary of the scene.

The AV signal may include at least one of a video signal and an audio signal.

The AV signal processing apparatus may further include intensity value calculation means for calculating an intensity value indicative of a degree of the variation of the measurement value corresponding to the reference segment.

The measurement value calculation means may calculate similar segments in a predetermined time area with respect to the reference segment, analyze the time distribution of the similar segments and determine a ratio at which the similar segments are present in the past and in the future to calculate the measurement value.

The boundary discrimination means may discriminate based on a sum total of the absolute values of the measurement values whether or not the reference segment is the boundary of the scene.

The AV signal processing apparatus may further include audio segment production means for detecting, when the AV signal includes a video signal, a shot which is a basic unit of a video segment to produce the audio segment.

The AV signal processing apparatus may further include audio segment production means for using, when the AV signal includes an audio signal, at least one of the feature amount of the audio signal and a no sound period to produce an audio segment.

The feature amounts of the video signal may at least include a color histogram.

The feature amounts of the video signal may at least include at least one of a sound volume and a spectrum.

The boundary discrimination means may compare the measurement value with a preset threshold value to discriminate whether or not the reference segment is a boundary of the scene.

According to another aspect of the present invention, there is provided an AV signal processing method for an AV signal processing apparatus for detecting and analyzing a pattern which reflects a significance structure of contents of an AV signal supplied thereto to detect a scene of a significant break, comprising a feature amount extraction step of extracting feature amounts of segments each formed from a series of frames which form the AV signal, a calculation step of calculating a measurement criterion to be used for measurement of a similarity of the feature amounts between a reference segment and other segments, a similarity measurement step of using the measurement criterion to measure the similarity between the reference segment and the other segments, a measurement value calculation step of using the similarity measured by the processing in the similarity measurement step to calculate a measurement value indicative of a possibility that the reference segment may be a boundary of the scene, and a boundary discrimination step of analyzing a variation of a pattern with respect to time of the measurement value calculated by the processing in the measurement value calculation step and discriminating based on a result of the analysis whether or not the reference segment is the boundary of the scene.

According to a further aspect of the present invention, there is provided a recording medium on which a computer-readable program for AV signal processing for detecting and analyzing a pattern which reflects a significance structure of contents of a supplied AV signal to detect a scene of a significant break is recorded, the program including a feature amount extraction step of extracting feature amounts of segments each formed from a series of frames which form the AV signal, a calculation step of calculating a measurement criterion to be used for measurement of a similarity of the feature amounts between a reference segment and other segments, a similarity measurement step of using the measurement criterion to measure the similarity between the reference segment and the other segments, a measurement value calculation step of using the similarity measured by the processing in the similarity measurement step to calculate a measurement value indicative of a possibility that the reference segment may be a boundary of the scene, and a boundary discrimination step of analyzing a variation of a pattern with respect to time of the measurement value calculated by the processing in the measurement value calculation step and discriminating based on a result of the analysis whether or not the reference segment is the boundary of the scene.

With the AV signal processing apparatus and method and the program of the recording medium, feature amounts of segments each formed from a series of frames which form the AV signal are extracted, and a measurement criterion to be used for measurement of a similarity of the feature amounts between a reference segment and other segments is calculated. Then, the measurement criterion is used to measure the similarity between the reference segment and the other segments, and the measured similarity is used to calculate a measurement value indicative of a possibility that the reference segment may be a boundary of the scene. Thereafter, a variation of a pattern with respect to time of the measurement value calculated is analyzed, and it is discriminated based on a result of the analysis whether or not the reference segment is the boundary of the scene. Therefore, a boundary of a scene can be detected, and consequently, recorded video data can be played back beginning with an arbitrary scene.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 8 is a flow chart illustrating processing of a scene detection section of the video-audio processing apparatus shown in FIG. 3.

DETAILED DESCRIPTION OF THE PREFERRED EMBODIMENT

According to the present invention, video data are cut in a unit of a scene which is a set of significant segments. The term "cut" here signifies detection of a boundary between scenes. Segments which compose a scene have features unique to the scene, and therefore, if a boundary between adjacent scenes is passed, then the segments which compose the scene exhibit significantly different features from those of the segments of the other scene. In other words, a place at which such a notable difference appears is a boundary between scenes, and a series of segments can be cut in a unit of a scene by detecting such a boundary.

Before the processing just described is performed, object video data are first divided in a unit of a segment similarly as in the conventional video extraction techniques described hereinabove. The segments obtained by such division form a time series, and it is necessary to discriminate whether or not a scene boundary is present between each segment and another segment next to the segment. Here, each segment is determined as a reference, and it is investigated at what place in time a similar segment is present among neighboring segments.

If a scene boundary is detected, then a changing point at which a peculiar change appears in a short time from a pattern wherein similar segments are present in a concentrated manner in the past to another pattern wherein similar segments are present in a concentrated manner in the future is detected. In order to find out a place at which such pattern change occurs, sufficient information is obtained only by investigating a local change around a boundary of a scene.

Further, it is also possible to measure the magnitude of the local change to control cutting of a scene stepwise. This is because it has been empirically found out that a visual changing point coincides well with a significant changing point of a scene. The present invention makes use of the foregoing to detect a boundary of a scene and cut scenes of video data or the like. Further, the present invention makes it possible for a user to see video data easily based on such scene boundary information.

Now, an outline of the present invention is described more specifically. First, features of video data where a boundary between scenes is present and where a boundary is not present between scenes are described individually. An example of particular video data is illustrated in FIG. 2.

Figure 2:
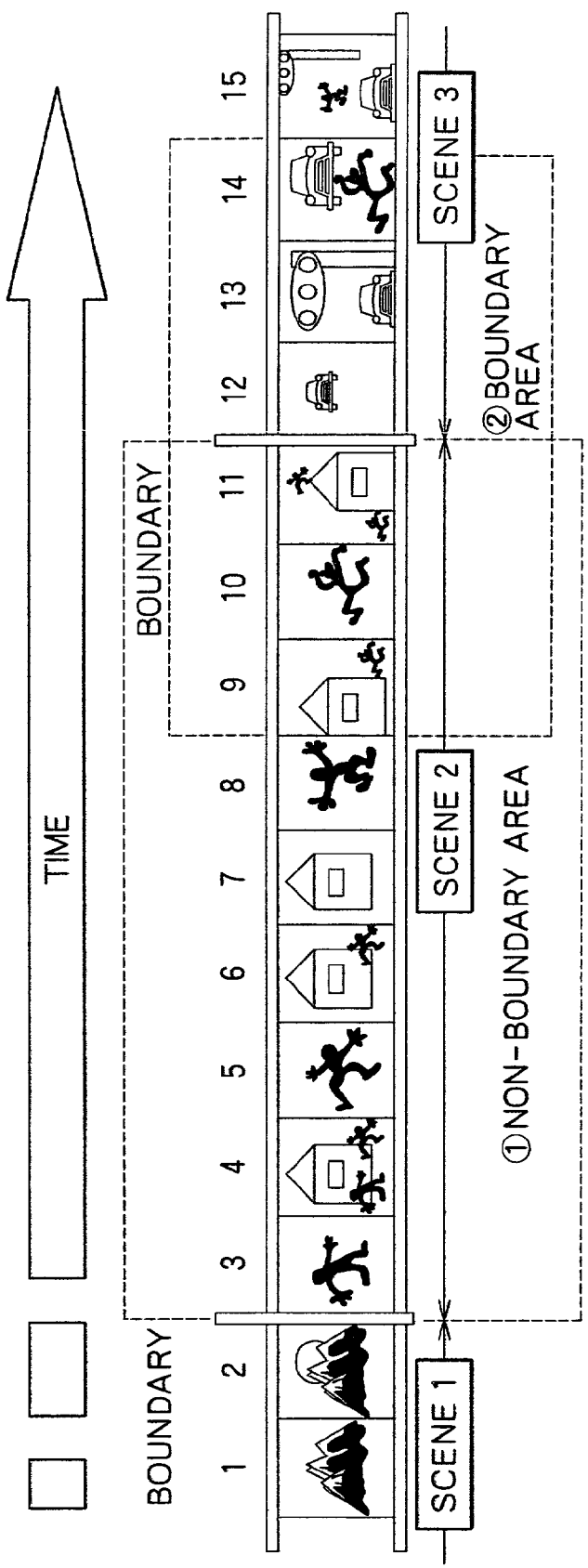
FIG. 2 is a schematic view showing a boundary area and a non-boundary area of a scene.

Referring to FIG. 2, the video data are illustrated in a unit of a segment and includes three scenes 1 to 3. The time axis is directed in the rightward direction in FIG. 2. An area in which no boundary is present is denoted as non-boundary area while an area in which a boundary is present is denoted as boundary area, and the two areas are shown in more detail in FIGS. 4A and 4B, respectively.

Figure 4:
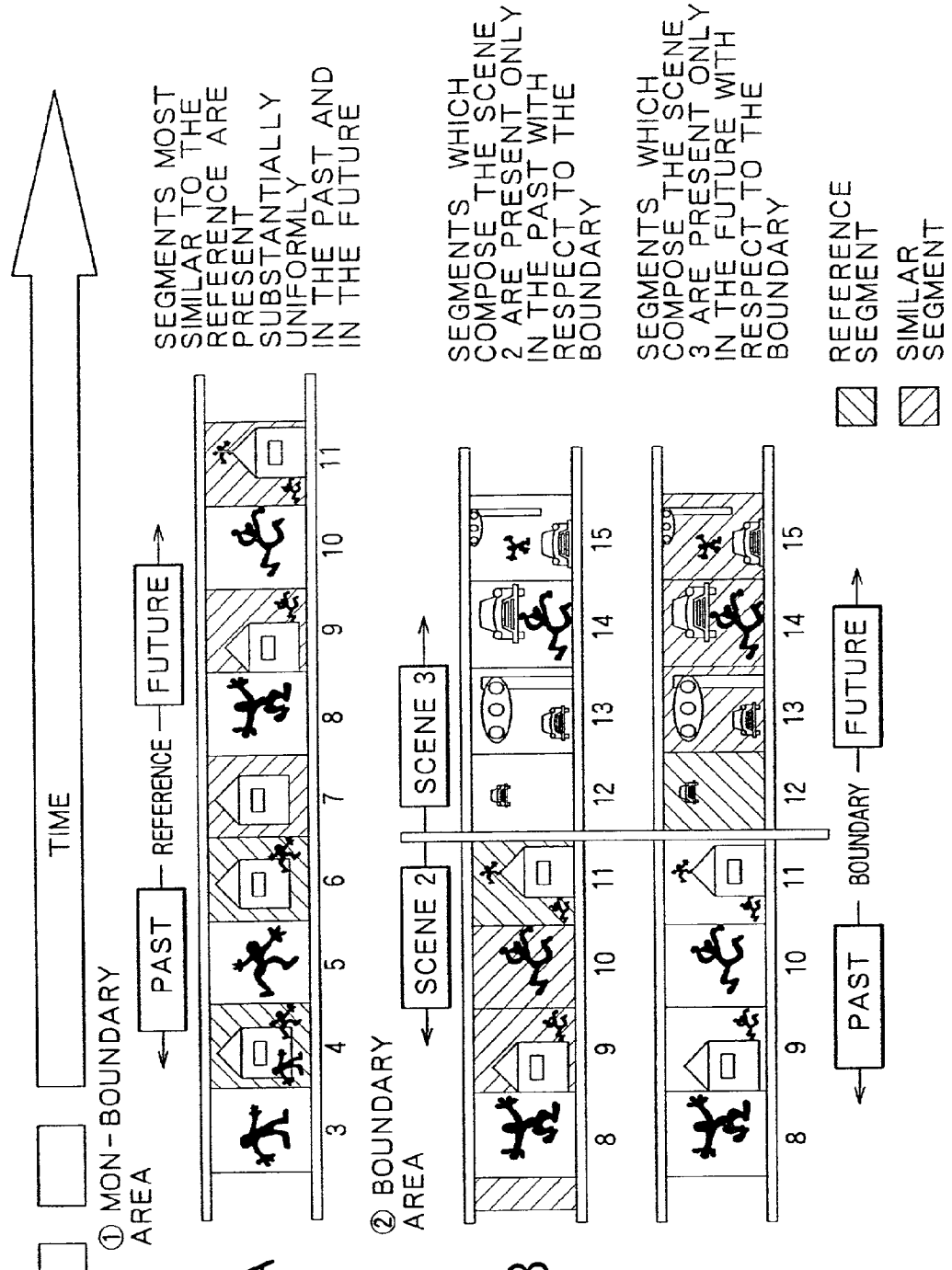
FIGS. 4A and 4B are schematic views showing a boundary area between scenes.

The video data within the time of the scene 2 is shown in the non-boundary area of FIG. 4A and includes the segments 3 to 11 which do not include a boundary from another scene. In contrast, the boundary area of FIG. 4B is a time area of the segments 8 to 15 which includes a boundary area between the scene 2 and the scene 3 and in which the two scenes are contiguous to each other.

First, features of the non-boundary area which does not include a boundary are described. Since the boundary area is composed only of similar segments, where the segments are divided into those in the past and those in the future with respect to a reference segment in the non-boundary area, similar segments are present substantially uniformly in the two time zones. Therefore, the distribution pattern of similar segments does not exhibit a peculiar variation.

Different from the non-boundary area, the boundary area represents a time zone which includes a boundary point at which two scenes are continuous to each other. The scene here signifies a scene composed of segments having a high similarity to each other. Therefore, the segments 8 to 11 which compose the scene 2 and the segments 12 to 15 which compose the different scene 3 are contiguous to each other, and the features of the segments of the scenes are different across the boundary between the scenes.

In order to detect a boundary of a scene, it is first assumed that each segment is a time reference (present). Then, the detection of a boundary of a scene can be realized by investigating the variation of the distribution pattern with respect to time of most similar segments to each of the segments (whether such similar segments belong to the past or the future with respect to the reference).

More specifically, as can been from the boundary area shown in FIG. 4B, as the segments 8 to 11 are successively used as the time reference and the time reference approaches the boundary, the ratio of those most similar segments which belong to the past to those which belong to the future gradually increases, and immediately prior to the boundary (at the end of the scene), the ratio becomes 100%. Then, immediately after the reference segment exceeds the boundary (at the top of the next scene), conversely the ratio of those most similar segments which belong to the future to those which belong to the past exhibits 100%. Then, as the segments 12 to 15 are successively used as the time reference, the ratio described above decreases.

Accordingly, a place which is a boundary of a scene with the highest possibility can be specified from a variation of the pattern of the distribution ratio with respect to time of such most similar segments. Further, since the typical pattern appears with a very high possibility at a local portion in the proximity of a boundary of a scene, only if segments around a boundary are checked, then the boundary can be specified from the variation of the pattern. In other words, the time area within which the distribution pattern of similar segments need not be set to a greater area than a particular area.

Further, if the variation of the pattern is represented by a numerical value, then the degree of the variation of the value varies together with the degree of a visual variation of the scene. And, it is known empirically and based on a result of an experiment that the degree of the visual variation of the scene changes together with the degree of a significant variation of the scene. Accordingly, if the numerical value mentioned above is determined as a boundary likelihood measurement value, then a scene corresponding to the magnitude of the significant degree of a scene can be detected based on the magnitude of the boundary likelihood measurement value.

Now, video data which is an object of processing of a video-audio processing apparatus to which the present invention is applied is described.

Figure 1:
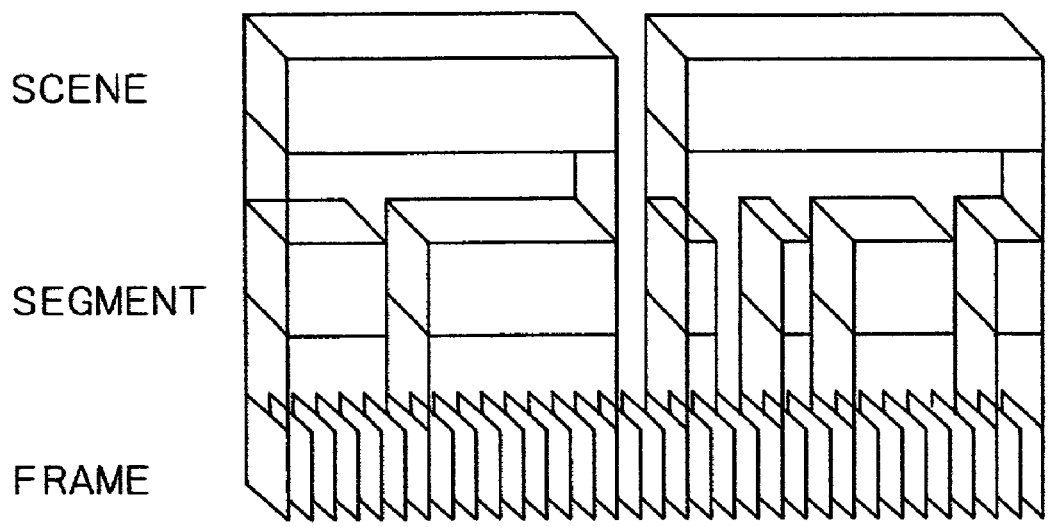
FIG. 1 is a schematic view showing a hierarchical model of video data.

In the present invention, it is assumed that video data of an object of processing has such a modeled data structure as shown in FIG. 1 wherein it has three hierarchical layers of frame, segment and scene. In particular, the video data is composed of a series of frames in the lowermost hierarchical layer. Further, the video data is composed of segments, each of which is formed from a series of successive frames, in a higher hierarchical layer. Furthermore, the video data is composed of scenes, each of which is formed from segments collected based on a significant relation, in the highest hierarchical layer.

The video data usually includes both of video and audio information. In particular, a frame of the video data includes a video frame which is a single still picture and an audio frame representative of audio information usually sampled in a short time such as several tens to several hundreds milliseconds/length.

Meanwhile, a video segment is formed from a series of video frames picked up successively by means of a single camera and is usually called shot.

On the other hand, an audio segment can be defined in various manners. As one of such definitions, an audio segment is formed with a boundary defined by a no sound period in video data detected by a method well known in the art. An audio segment is sometimes formed from a series of audio frames which are classified into a small number of categories such as, for example, voice, music, noise, no sound and so forth as disclosed in D. Kimber and L. Wilcox, "Acoustic Segmentation for Audio Browsers", Xerox Parc Technical Report. Further, an audio segment is sometimes determined based on a turning point of sound detected as a great change in a certain feature between two successive audio frames as disclosed in S. Pfeiffer, S. Fischer and E. Wolfgang, "Automatic Audio Content Analysis", Proceeding of ACM Multimedia 96, November 1996, pp 21–30.

A scene is based on significance of contents of video data and belongs to a higher level. A scene is subjective and relies upon contents or a genre of video data. A scene is composed of video segments or audio segments whose features are similar to each other.

Here, a changing point is detected at which a peculiar change is exhibited from a pattern wherein segments present in the proximity of each segment in video data and having similar features to those of the segment are present in a concentrated manner in the past to another pattern wherein segments in the proximity of each segment in video data and having similar features are present in a concentrated manner in the future, and those segments from the changing point to a next point are determined as one scene. The reason why such patterns correspond to a break between scenes is that similar features of the segments exhibit a significant variation at the boundary between the scenes because the features of the segments included in the scenes are different from each other. This is much related to a significance structure at a high level of video data, and a scene indicates such a significant mass of video data at a high level.

Now, a typical configuration of a video-audio processing apparatus to which the present invention is applied is described with reference to FIG. 3. The video-audio processing apparatus measures a similarity between segments of video data using feature amounts of the segments and collects similar segments into scenes to automatically extract a video structure. Thus, the video-audio processing apparatus can be applied to both of video segments and audio segments.

The video-audio processing apparatus includes a video division section 11 for dividing a stream of video data inputted thereto into video segments, audio segments or video and audio segments, a video segment memory 12 for storing division information of the video data, a video feature amount extraction section 13 for extracting feature amounts of the video segments, an audio feature amount extraction section 14 for extracting feature amounts of the audio segments, a segment feature amount memory 15 for storing the feature amounts of the video segments and the audio segments, a scene detection section 16 for collecting the video segments and the audio segments into scenes, and a feature amount similarity measurement section 17 for measuring a similarity between two segments.

The video division section 11 divides a stream of video data inputted thereto and including video data and audio data of various digital formats including a compression video data format such as, for example, the MPEG (Moving Picture Experts Group) 1, the MPEG 2 or the DV (Digital Video) into video segments, audio segments or video and audio segments.

Where the inputted video data are of a compression format, the video division section 11 can process the compressed video data directly without decompressing them fully. The video division section 11 processes the inputted video data to classify them into video segments and audio segments. Further, the video division section 11 outputs division information which is a result of division of the inputted video data to the video segment memory 12 in the next stage. Furthermore, the video division section 11 outputs the division information to the video feature amount extraction section 13 and the audio feature amount extraction section 14 in accordance with the video segments and the audio segments.

The video segment memory 12 stores the division information of the video data supplied thereto from the video division section 11. Further, the video segment memory 12 outputs the division information to the scene detection section 16 in response to an inquiry from the scene detection section 16 which is hereinafter described.

The video feature amount extraction section 13 extracts feature amounts of each of the video segments obtained by the division of the video data by the video division section 11. The video feature amount extraction section 13 can process compressed video data directly without decompressing them fully. The video feature amount extraction section 13 outputs the extracted feature amounts of each video segment to the segment feature amount memory 15 in the next stage.

The audio feature amount extraction section 14 extracts feature amounts of each of the audio segments obtained by the division of the video data by the video division section 11. The audio feature amount extraction section 14 can process compressed audio data directly without decompressing them fully. The audio feature amount extraction section 14 outputs the extracted feature amounts of each audio segment to the segment feature amount memory 15 in the next stage.

The segment feature amount memory 15 stores the feature amounts of each video segment and each audio segment supplied thereto from the video feature amount extraction section 13 and the audio feature amount extraction section 14, respectively. The segment feature amount memory 15 outputs the feature amounts or the segments stored therein to the feature amount similarity measurement section 17 in response to an inquiry from the feature amount similarity measurement section 17 which is hereinafter described.

The scene detection section 16 uses the division information stored in the video segment memory 12 and similarities between segments to discriminate whether or not a video segment and an audio segment make a boundary of a scene. The scene detection section 16 specifies a changing point across which the distribution pattern of those neighboring segments which are in the neighborhood of and have very similar feature amounts to those of each segment changes from that wherein such segments are concentrated in the past to that wherein such segments are concentrated in the future to detect boundaries of a scene to determine a top portion and a last portion of the scene. The scene detection section 16 shifts the reference segment by one segment in a time series each time a segment is detected and measures the distribution pattern of those segments which are in the proximity of and most similar to the reference segment. The scene detection section 16 uses the feature amount similarity measurement section 17 to specify the number of those neighboring segments which are most similar to the reference segment. In other words, the scene detection section 16 determines the number of the most neighboring feature amounts in the feature space. Then, the scene detection section 16 specifies a boundary of a scene from a change of the pattern of the difference between the number of the most similar neighboring segments in the past and the number of those in the future across a segment.

The feature amount similarity measurement section 17 measures the similarity between each segment and neighboring segments. The feature amount similarity measurement section 17 issues an inquiry to the segment feature amount memory 15 to search for feature amounts regarding a certain segment.

A video data recording section 18 records additional information data which is various kinds of data regarding a video stream and video data. The video data recording section 18 stores scene boundary information outputted from the scene detection section 16 and an intensity value calculated with regard to a scene.

A video display section 19 displays video data from the video data recording section 18 using a displaying method such as a thumb nail displaying method or a random accessing method based on various additional information data. This increases the degree of freedom in recognition of video data by the user and allows convenient display of video data.

A control section 20 controls a drive 21 to read out a controlling program stored on a magnetic disk 22, an optical disk 23, a magneto-optical disk 24 or a semiconductor memory 25 and controls the components of the video-audio processing apparatus based on the thus read out controlling program.

Figure 5:
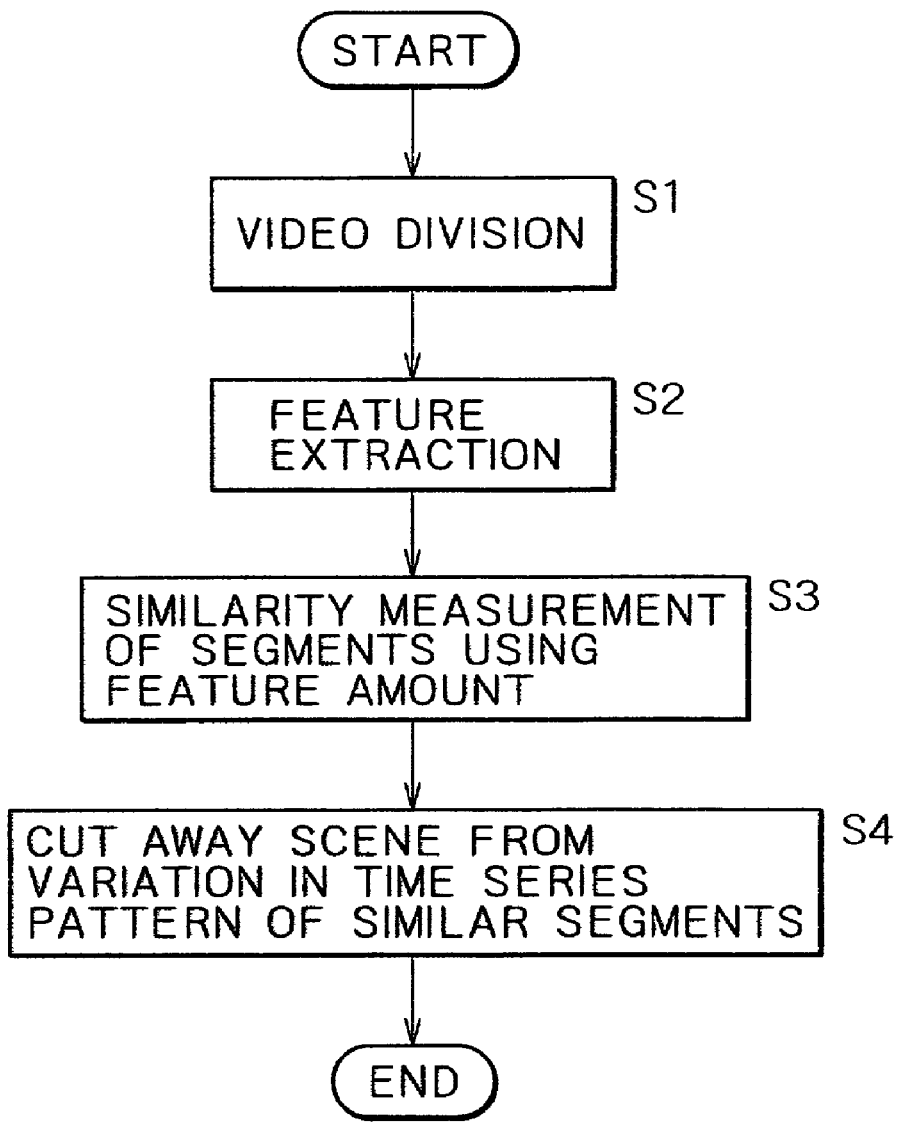
FIG. 5 is a flow chart illustrating operation of the video-audio processing apparatus shown in FIG. 3.

The video-audio processing apparatus performs such a sequence of processes as generally illustrated in FIG. 5 to detect a scene.

Referring to FIG. 5, the video-audio processing apparatus first performs video division in step S1. In particular, the apparatus divides video data inputted to the video division section 11 into video segments or audio segments or, if possible, into both of video and audio segments.

No particular prior condition is provided for the video dividing method applied by video-audio processing apparatus. For example, the video-audio processing apparatus may perform video division using such a method as disclosed in G. Ahanger and T. D. C. Little, "A survey of technologies for parsing and indexing digital video", J. of Visual Communications and Image Representation 7:28-4, 1996. Such a video dividing method as just mentioned is well known in the art, and the video-audio processing apparatus may use any video dividing method.

Then in step S2, the video-audio processing apparatus performs extraction of feature amounts. In particular, the video-audio processing apparatus calculates feature amounts representative of features of the segment by means of the video feature amount extraction section 13 and the audio feature amount extraction section 14. The video-audio processing apparatus here calculates, for example, a time length of each segment, a video feature amount such as a color histogram or a texture feature, a frequency analysis result, an audio feature amount such as a level or a pitch, an activity measurement result and so forth as applicable feature amounts. Naturally, the feature amounts applicable to the video-audio processing apparatus are not limited to those specifically listed above.

Then in step S3, the video-audio processing apparatus performs similarity measurement between segments using the feature amounts. In particular, the video-audio processing apparatus performs dissimilarity measurement by means of the feature amount similarity measurement section 17 and measures based on a measurement criterion to which degree each segment is similar to neighboring segments. The video-audio processing apparatus uses the feature amounts extracted in step S2 to calculate the dissimilarity measurement criterion.

Then in step S4, the video-audio processing apparatus discriminates whether or not the segment corresponds to a break of a scene. In particular, the video-audio processing apparatus uses the dissimilarity measurement criterion calculated in step S3 and the feature amounts calculated in step S2 to determine, regarding each segment as the reference segment at present, in which one of the past and the future with respect to the reference segment the ratio of presence of neighboring similar segments is higher, and investigates the pattern of the change of the ratio to discriminate whether or not the reference segment corresponds to a boundary of a scene. The video-audio processing apparatus thus outputs whether or not each segment is a break of a scene finally.

The video-audio processing apparatus can detect a scene from the video data through such a sequence of processes as described above.

Accordingly, the user can use a result of the detection to summarize contents of the video data or access an interesting point in the video data rapidly.

Now, the sequence of processes described above is described more detail for the individual steps.

The video division in step S1 is described first. The video-audio processing apparatus divides video data inputted to the video division section 11 into video segments or audio segments or, if possible, into video and audio segments. Here, a number of techniques are available for automatically detecting a boundary of a segment of video data, and in the video-audio processing apparatus, no particular prior condition is provided for the video dividing method as described hereinabove.

On the other hand, in the video-audio processing apparatus, the accuracy in scene detection by later processing essentially relies upon the accuracy in video division. It is to be noted that scene detection by the video-audio processing apparatus can allow some errors upon video division. Particularly, in the video-audio processing apparatus, video division is preferably performed with excessive segment detection rather than insufficient segment detection. As far as detection of similar segments is performed excessively, generally segments obtained as a result of excessive detection can be collected as the same scene upon scene detection.

Now, the feature amount detection in step S2 is described. A feature amount is an attribute of a segment which represents a feature of the segment and provides data for measurement of a similarity between different segments. The video-audio processing apparatus calculates feature amounts of each segment by means of the video feature amount extraction section 13 and/or the audio feature amount extraction section 14 to represent features of the segment.

Although the video-audio processing apparatus does not rely upon particulars of any feature amount, the feature amounts which are considered to be effective for use with the video-audio processing apparatus may be, for example, video feature amounts, audio feature amounts and video-audio common feature amounts described below. The requirement for such feature amounts which can be applied to the video-audio processing apparatus is that they allow measurement of dissimilarity. Further, in order to assure a high efficiency, the video-audio processing apparatus sometimes perform the feature amount extraction and the video division described above simultaneously. The feature amounts described below allow such processing as just described.

The feature amounts described above include feature amounts which relate to videos. In the following description, the feature amounts which relate to videos are referred to as video feature amounts. Since a video segment is formed from successive video frames, by extracting an appropriate video frame from within a video segment, contents represented by the video segment can be characterized with the extracted video frame. In particular, the similarity of a video segment can be replaced with the similarity of a video frame extracted appropriately. In short, a video feature amount is one of important feature amounts which can be used by the video-audio processing apparatus. The video feature amount by itself in this instance can merely represent static information. However, the video-audio processing apparatus extracts a dynamic feature of a video segment based on the video feature amount by applying such a method as hereinafter described.

Although a large number of video feature amounts are known, since it has been found out that a color feature amount (histogram) and a video correlation provide a good equilibrium between the calculation cost and the accuracy to scene detection, the video-audio processing apparatus uses the color feature amount and the video correlation as the video features.

In the video-audio processing apparatus, a color of a video is an important material for discrimination of whether or not two videos are similar to each other. Use of a color histogram for discrimination of the similarity between videos is well known in the art and disclosed, for example, in G Ahanger and T. D. C. Little, "A survey of technologies for parsing and indexing digital video", J. of Visual Communication and Image Representation 7:28 -4, 1996.

A color histogram is prepared by dividing a three-dimensional color space of, for example, LUV, RGB or the like into n regions and calculating relative ratios of frequencies of appearance of pixels of a video in the individual regions. Then, from the information obtained, an n-dimensional vector is given. From compressed video data, a color histogram can be extracted directly as disclosed, for example, in U.S. Pat. No. 5,708,767.

The video-audio processing apparatus thus obtains a histogram vector of an original YUV color space of a video (of a system used commonly such as the MPEG 1/2 or the DV) which composes a segment.

Specifically, the video-audio processing apparatus obtains a $2^{2 \cdot 3}$=64-dimensional histogram vector through sampling of an original YUV color space of a video (of a system used commonly such as the MPEG 1/2 or the DV) which composes a segment with 2 bits per color channel.

Such a histogram as described above represents a general color tone of the video, but does not include time information. Therefore, the video-audio processing apparatus uses the video correlation as another video feature amount. In scene detection by the video-audio processing apparatus, a structure of a plurality of similar segments which intersect with each other is a convincing index that it is a single united scene structure.

For example, in a scene of conversation, the target of the camera alternately moves between two talking persons, and when the camera takes the same talking person next, it is directed back to a substantially same position. It has been found out that, in order to detect a structure in such a case as just described, a relation based on reduced videos of a gray scale makes a good index to the similarity of a segment. Therefore, the video-audio processing apparatus reduces an original video to a gray scale video of the size of M×N by sub-sampling and uses the gray scale video to calculate a video correlation. Here, M and N may be sufficiently low values and, for example, 8×8. In short, such reduced gray scale videos are interpreted as MN-dimensional feature amount vectors.

Feature amounts regarding an audio are feature amounts different from the video feature amounts described above. In the following description, such feature amounts are referred to as audio feature amounts. An audio feature amount is a feature amount which can represent contents of an audio segment, and the video-audio processing apparatus can use a frequency analysis, a pitch, a level or the like as such an audio feature amount. Such audio feature amounts are known from various documents.

The video-audio processing apparatus can perform frequency analysis such as fast Fourier transform to determine the distribution of frequency information of a single audio frame. In order to represent the distribution of frequency information, for example, over an audio segment, the video-audio processing apparatus can use FFT (Fast Fourier Transform) components, a frequency histogram, a power spectrum, a cepstrum or some other feature amount.

Further, the video-audio processing apparatus can use also a pitch such as an average pitch or a maximum pitch or an audio level such as an average loudness or a maximum loudness as an effective audio feature amount for representing an audio segment.

Furthermore, a video-audio common feature amount is listed as another feature amount. Although the video-audio common feature particularly is neither a video feature amount nor an audio feature amount, it provides information useful for the video-audio processing apparatus to represent a feature of a segment in a scene. The video-audio processing apparatus uses a segment length and an activity as such video-audio common feature amounts.

The video-audio processing apparatus can use the segment length as a video-audio common feature amount. The segment length is a time length of a segment. Generally, a scene has a rhythm feature unique to the scene. The rhythm feature appears as a variation of the segment length in the scene, and, for example, short segments stretched rapidly represent a commercial message. Meanwhile, segments in a scene of conversion are longer than those of a commercial message, and a scene of conversion has a characteristic that segments combined with each other are similar to each other. The video-audio processing apparatus can use a segment length having such characteristics as just described as a video-audio common feature amount.

Further, the video-audio processing apparatus can use an activity as a video-audio common feature amount. The activity is an index representative of to what degree contents of a segment are felt dynamic or static. For example, where contents of a segment are visually dynamic, the activity represents a degree with which the camera moves rapidly along the subject or with which the object being image changes rapidly.

The activity is calculated indirectly by measuring an average value of inter-frame dissimilarities of such feature amounts as a color histogram. Here, where the dissimilarity measurement criterion for the feature amount F measured between a frame i and another frame j is $d_F(i, j)$, the video activity $V_F$ is defined by the following expression (1):

$$V_F = \frac{\sum_{i=b}^{f-1} d_F(i, i+1)}{f - b + 1} \quad (1)$$

where b and f are the frame numbers of the first and last frames of one segment, respectively. The video-audio processing apparatus particularly uses, for example, a histogram described above to calculate the activity $V_F$.

While the feature amounts described above including the video feature amounts basically represent static information of a segment, in order to represent features of a segment accurately, also dynamic information must be taken into consideration. Therefore, the video-audio processing apparatus represents dynamic information using such a sampling method of feature amounts as described below.

The video-audio processing apparatus extracts more than one static feature amount from different points of time within one segment, for example, as seen from FIG. 5. In this instance, the video-audio processing apparatus determines the extraction number of feature amounts by balancing maximization of the fidelity and minimization of the data redundancy in the segment representation. For example, where a certain one image in a segment can be designated as a key frame of the segment, a histogram calculated from the key frame is used as sample feature amounts to be extracted.

The video-audio processing apparatus uses a sampling method, which is hereinafter described, to determine which one of those samples which can be extracted as a feature should be selected from within the object segment.

Here, a case wherein a certain sample is selected normally at a predetermined point of time, for example, at the last point of time in a segment, is considered. In this instance, there is the possibility that, from arbitrary two segments which are changing (fading) to a dark frame, resulting feature amounts may be the same as each other because the samples are the same dark frame. In other words, whatever the video contents of the segments are, the selected two frames are determined to be very similar to each other. Such a problem as just described occurs because the samples do not have good representative values.

Therefore, the video-audio processing apparatus do not extract a feature amount at such a fixed point as described above but extracts a statistic representative value of an entire segment. Here, a popular feature amount sampling method is described in connection with two cases including a first case wherein feature amounts can be represented as an n-dimensional vector of a real number and a second case wherein only the dissimilarity measurement criterion can be applied. It is to be noted that, in the first case, very well known video feature amounts and audio feature amounts such as a histogram and a power spectrum are involved.

In the first case, the sample number is determined to be k in advance, and the video-audio processing apparatus uses a well-known k-means-clustering method disclosed in L. Kaufman and P. J. Rousseeuw, "Finding Groups in Data: An Introduction to Cluster Analysis", John-Wiley and sons, 1990 to automatically divide the feature amounts regarding the entire segment into groups each including k feature amounts. Then, the video-audio processing apparatus selects, from each group of k samples, a sample whose sample value is equal or proximate to a centroid of the group. The complexity of the processing by the video-audio processing apparatus increases merely linearly in proportion to the sample number.

Meanwhile, in the second case, the video-audio processing apparatus uses a k-medoids algorithm method disclosed in L. Kaufman and P. J. Rousseeuw, "Finding Groups in Data: An Introduction to Cluster Analysis", John-Wiley and sons, 1990 to form groups of k samples. Then, the video-audio processing apparatus uses, as a sample value for each of the groups of k samples, a medoid of the group described above.

It is to be noted that, in the video-audio processing apparatus, the method of forming a dissimilarity measurement criterion for a feature amount representative of an extracted dynamic feature is based on the dissimilarity measurement criterion for the static feature amount on which the dynamic feature amount is based. This, however, is hereinafter described.

In this manner, the video-audio processing apparatus can extract a plurality of static feature amounts and can use a plurality of such static feature amounts to represent a dynamic feature amount.

As described above, the video-audio processing apparatus can extract various feature amounts. Generally, each of such feature amounts is in most cases insufficient to solely represent a feature of a segment. Therefore, the video-audio processing apparatus can combine the feature amounts suitably to select a set of feature amounts which make up for each other. For example, by combining a color histogram and a video correlation described above, the video-audio processing apparatus can obtain more information than information each feature amount has.

Now, the similarity measurement between segments which uses feature amounts in step S3 of FIG. 5 is described. The video-audio processing apparatus uses the dissimilarity measurement criterion, which is a function for calculation of a real value to measure to which degree two feature amounts are not similar to each other, to perform similarity measurement of segments by means of the feature amount similarity measurement section 17. The dissimilarity measurement criterion indicates that, when the value thereof is low, the two feature amounts are similar to each other, but when the value thereof is high, the two feature amounts are not similar to each other. Here, a function for calculation of the dissimilarity of two segments $S_1$ and $S_2$ regarding the feature amount F are defined as a dissimilarity measurement criterion $d_F(S_1, S_2)$. It is to be noted that this function need satisfy relationships given by the following expression (2):

$$d_F(S_1, S_2) = 0 \text{(when } S_1 = S_2\text{)}$$

$$d_F(S_1, S_2) \geq 0 \text{(for all } S_1, S_2\text{)}$$

$$d_F(S_1, S_2) = d_F(S_2, S_1) \text{ (for all } S_1, S_2\text{)} \quad (2)$$

Although some dissimilarity measurement criterion can be applied only to a certain feature amount, generally most dissimilarity measurement criteria can be applied to measurement of the similarity regarding a feature amount represented as a point in an n-dimensional space as disclosed in G. Ahanger and T. D. C. Little, "A survey of technologies for parsing and indexing digital video", J. of visual Communication and Image Representation 7:23-4, 1996 or in L. Kaufman and P. J. Rousseeuw, "Finding Groups in Data: An Introduction to Cluster Analysis", John-Wiley and sons, 1990.

The Euclidean distance, the inner product, and the L1 distance are particular examples. Here, since particularly the L1 distance acts effectively upon various feature amounts including such feature amounts as a histogram or a video correlation, the video-audio processing apparatus uses the L1 distance. Here, where two n-dimensional vectors are represented by A and B, the L1 distance $d_{L1}(A, B)$ between A and B is given by the following expression (3):

$$d_{L1} = (A, B) = \sum_{i=1}^{n} |Ai - Bi| \quad (3)$$

where the subscript i indicates the i-dimensional elements of the n-dimensional vectors A and B.

Further, as described hereinabove, the video-audio processing apparatus extracts static feature amounts at various points of time in segments as feature amounts representative of dynamic features. Then, in order to determine a similarity between two extracted dynamic feature amounts, a dissimilarity measurement criterion between static feature amounts on which the dynamic feature amounts are based as a dissimilarity measurement reference for the similarity. Such dissimilarity measurement criteria for dynamic feature amounts are in most cases determined best using a dissimilarity value between the most similar pair of static feature amounts selected from the dynamic feature amounts. In this instance, the dissimilarity measurement criterion between two extracted dynamic feature amounts $SF_1$ and $SF_2$ is defined as given by the following expression (4):

$$d_s(SF_1, SF_2) = \min_{F1 \in SF1, F2 \in SF2} d_F(F_1, F_2) \quad (4)$$

where the function $d_F(F_1, F_2)$ indicates the dissimilarity measurement criterion regarding the static feature amount F on which the dynamic feature amounts $SF_1$ and $SF_2$ are based. It is to be noted that, according to circumstances, not the lowest value of the dissimilarity of a feature amount but the highest value or an average value may be used.

In order for the video-audio processing apparatus to determine the dissimilarity between segments, it is sometimes insufficient to use a single feature amount and thus necessary to combine information from a large number of feature amounts regarding the same segment. As one of such methods, the video-audio processing apparatus calculates the dissimilarity based on various feature amounts as a weighted combination of the feature amounts. In particular, where k feature amounts $F_1, F_2, \ldots, F_k$ are involved, the video-audio processing apparatus uses a dissimilarity measurement criterion $d_F(S_1, S_2)$ regarding combined feature amounts represented by the following expression (5):

$$d_F(S_1, S_2) = \sum_{i=1}^{k} w_i d_{Fi}(S_1, S_2) \quad (5)$$

where $w_i$ is the weighting coefficient which satisfies $\Sigma i w_i = 1$.

The video-audio processing apparatus can use the feature amounts extracted in step S2 of FIG. 5 to calculate a dissimilarity measurement criterion to measure the similarity between the segments in such a manner as described above.

Now, the cutting of a scene in step S4 of FIG. 5 is described. The video-audio processing apparatus uses the dissimilarity measurement criterion and the extracted feature amounts to detect a variation of the distribution pattern of neighboring, most similar segments to each segment to discriminate whether or not the segment is at a break of a scene, and outputs a result of the discrimination. The video-audio processing apparatus performs the following four processes to detect a scene.

In the process (1), when each segment is determined as a reference, a fixed number of most similar segments within a fixed time frame are detected.

In the process (2), after the process (1), the ratio in number of similar segments which are present in the past and in the future with respect to the reference segment is calculated (actually the number of similar segments present in the past are subtracted from the number of similar segments present in the future or the like), and a result of the calculation is determined as a boundary likelihood measurement value.

In the process (3), a variation with respect to time of the boundary likelihood measurement values obtained by the process (2) when each segment is determined as a reference is examined to detect a segment position which indicates a pattern wherein several segments having a high ratio in the past successively appear and several segments having a high ratio in the future successively appear.

In the process (4), the absolute values of the boundary likelihood measurement values in the process (3) are totaled, and the total value is called scene intensity value. If the scene intensity value exceeds a predetermined threshold value, then the segment is determined as a boundary of a scene.

Figure 6:
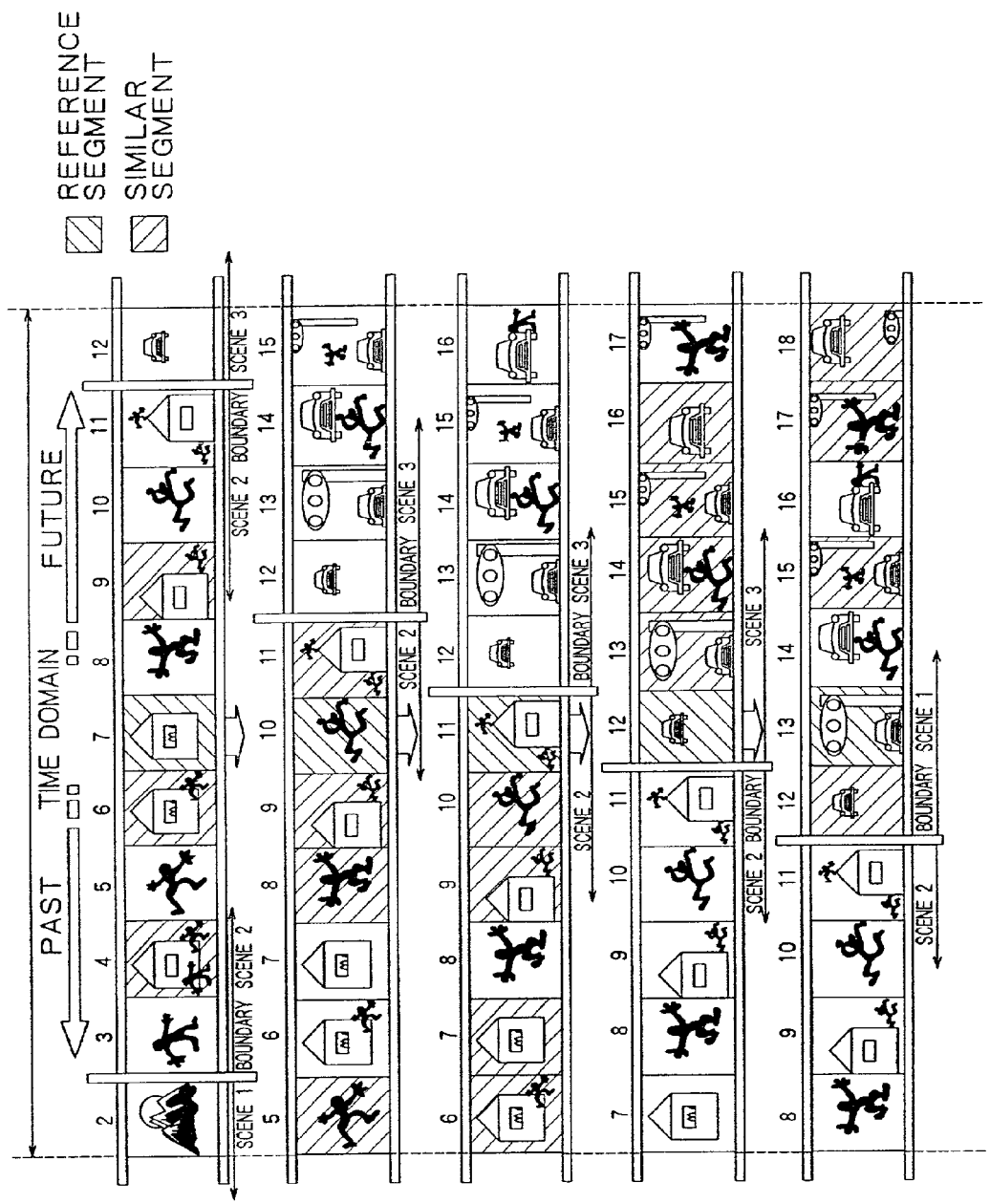
FIGS. 6A to 6E are schematic views showing a typical distribution pattern of similar segments.

The processes are described more specifically in order with reference to FIGS. 6A to 6E. In the process (1), for example, as shown in FIG. 6A, a time frame including arbitrary k segments in the past and k segments in the future is set for each segment (in the example shown in FIG. 6A, five segments), and N similar segments are detected from within the time frame (in FIG. 6A, four segments). The time advances to the future as the number which represents each segment increases. The central segment 7 in FIG. 6A indicated by slanting lines is a reference segment at a certain point of time, and similar segments to the reference segment are the segments 4, 6, 9 and 11 indicated by reversely slanting lines. Here, four similar segments are extracted, and two similar segments are present in the past while two similar segments are present in the future.

In the process (2), the boundary likelihood measurement value is calculated by dividing the number in the past by the number in the future or by subtracting the number in the future from the number in the past. Here, the boundary likelihood measurement value is calculated by the latter method. Here, each boundary likelihood measurement value is represented by Fi. i represents the position (number) of each segment. Now, by calculation according to the latter method, the boundary likelihood measurement value $F_6$ of FIG. 6A is 0.

In the process (3), the calculation in the process (2) is successively performed along the time axis. In FIG. 6B, it can be seen that, with reference to the segment 10 when the reference segment advances by 3 segments from that in FIG. 6A, three similar segments 5, 8 and 9 are present in the past while one similar segment 11 is present in the future. The boundary likelihood measurement value $F_{10}$ then is $F_{10}=1-3=-2$.

FIG. 6C illustrates a state when the reference segment further advances by one segment to a position immediately prior to a boundary of the scene. In the state illustrated, similar segments 6, 7, 9 and 10 to the reference segment 11 are all concentrated in the past. The boundary likelihood measurement value $F_{11}$ then is $F_{11}=0-4=-4$.

FIG. 6D illustrates a state when the reference segment advances by one segment from that of FIG. 6C and immediately after the reference segment passes the boundary and enters a new scene and thus comes to the segment 12 at the top of the scene. Similar segments are segments 13, 14, 15 and 16. Thus, the pattern in this instance has changed to a pattern wherein all of the similar segments are present in the future. The boundary likelihood measurement value $F_{12}$ then is $F_{12}=4-0=4$.

Finally, FIG. 6E illustrates a state when the reference segment further advances by one segment to the segment 13. Similarly, the likelihood measurement value $F_{13}$ then is $F_{13}=3-1=2$. According to the present method, when the ratio of similar segments in the past is higher, the sign is in the negative (minus sign) in this manner, and the positive sign (plus sign) indicates that the ratio is higher in the future. The variation of the boundary likelihood measurement value Fi then indicates such a pattern as $$0 \ldots -2 \rightarrow -4 \rightarrow +4 \rightarrow +2 \quad (6)$$

The position at which the change from −4 to +4 is exhibited corresponds to the boundary between the scenes. This represents that similar segments have such a pattern that, where the reference segment and hence the time frame is positioned intermediately of a scene as seen in FIG. 6A, similar segments in the time frame are present substantially uniformly in the past and in the future across the reference segment, and as the reference segment approaches a boundary of the scene, the ratio in which similar segments present in the past rises as seen in FIG. 6B until the ratio of similar segments present in the past comes to 100% in FIG. 6C, whereafter the ratio of similar segments present in the future changes to 100% immediately after the reference segment passes the boundary as seen in FIG. 6D. By detecting such a pattern as just described, a changing point at which the ratio of similar segments changes from substantially 100% of those present in the past to substantially 100% of those present in the future can be determined as a break of a scene.

Even in a non-boundary area of a scene, the ratio of similar segments sometimes exhibits a temporary change from a high ratio of similar segments in the past to a high ratio of similar segments in the future (for only one segment period). In most cases, however, this is not a boundary of a scene. This is because, in almost all cases, such a temporary change occurs accidentally. When a pattern is detected wherein a plurality of boundary likelihood measurement values which indicate that the ratio of similar segments present in the past is high as in a non-boundary area successively appear first and then a plurality of boundary likelihood measurement values which indicate that the ratio of similar segments present in the future successively appear, it is discriminated that the reference segment is a boundary of a scene with a high degree of possibility. In any other case, the reference segment is not a boundary of a scene with a high possibility, and therefore, it is not determined as a boundary of a scene.

In the process (4), after the process (3), the boundary likelihood measurement values are totaled to calculate the "intensity" of the scene boundary point. In order to measure the intensity, the absolute values of the boundary likelihood measurement values are added. The degree of the variation of the value of the intensity corresponds to the degree of the visual variation between the scenes, and the degree of the visual variation between the scenes corresponds to the degree of the significance variation. Accordingly, a scene corresponding to the magnitude of the significance degree of a scene can be detected depending upon the magnitude of the value.

Here, the total value of the absolute values is defined as scene intensity value $V_i$. In the definition, i represents the number of the segment. For example, the total value of the absolute values of four boundary likelihood measurement values (for each segment, boundary likelihood measurement values $F_{i-2}$, $F_{i-1}$, $F_i$, $F_{i+1}$ of four segments including two segments in the past, one segment in the future and the segment) are used.

It is considered that, in the pattern of the variation of the boundary likelihood measurement value at a boundary of a scene, a variation occurs from a case wherein similar segments are present by 100% in the past to another case wherein similar segments are present by 100% in the future like the value −4 of $F_{i-1}\rightarrow$value+4 of $F_i$ as given hereinabove.

In this manner, a great change occurs in a one-segment distance on the boundary between scenes. Then, the possibility that a variation in pattern may occur while the absolute value of the boundary likelihood measurement value remains high over four or more segments like the pattern of the expression (6) is not high except in the proximity of a boundary of a scene. From the characteristic of the variation in pattern, a desired scene can be detected by discriminating only a place at which the scene intensity value Vi is equal to or higher than a certain level as an actual boundary of a scene.

Figure 7:
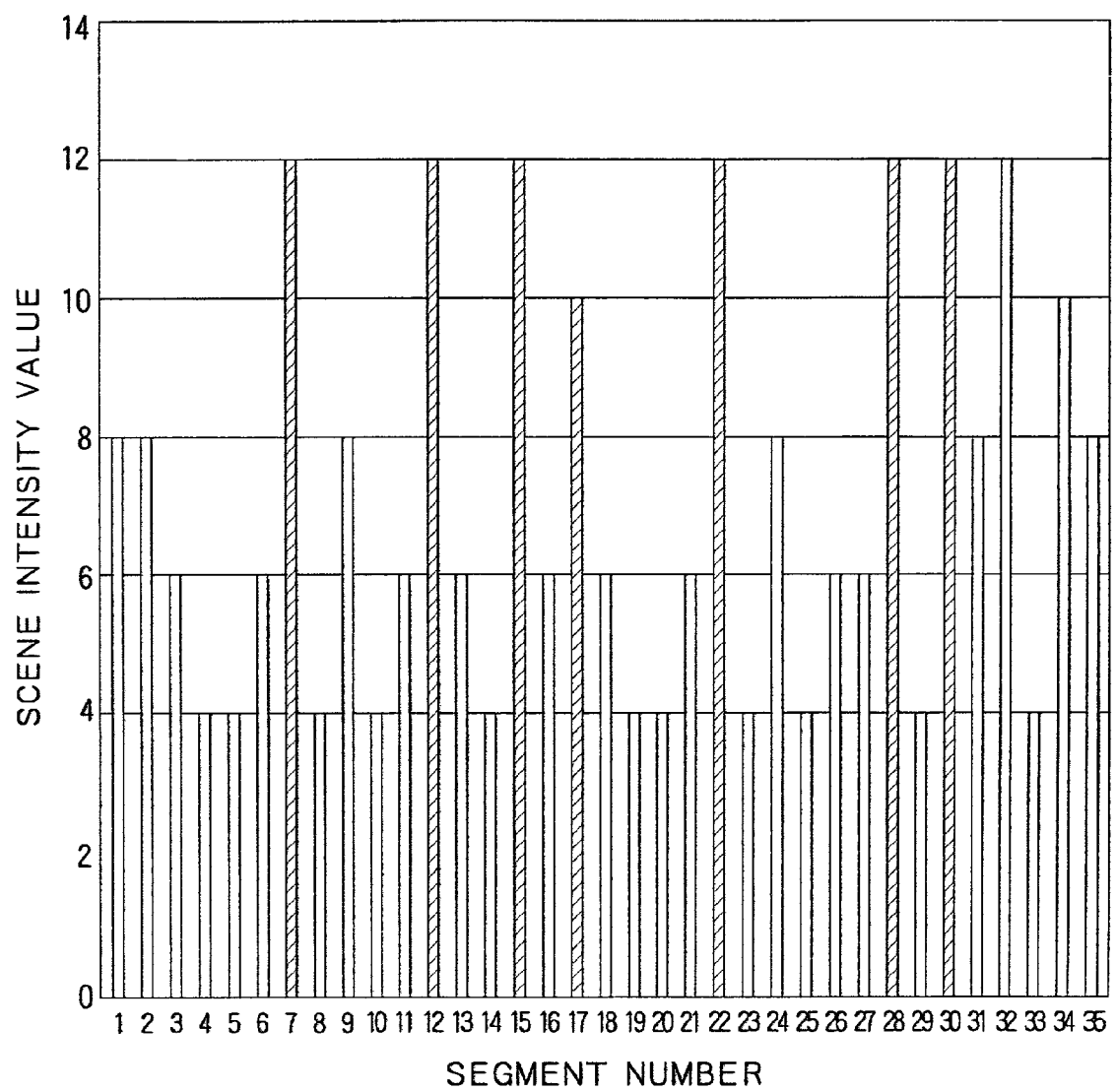
FIG. 7 is a diagram illustrating a result of scene detection.

FIG. 7 illustrates a graph of a result of use of video data for approximately 30 minutes of an actual music program. The axis of ordinate represents the scene intensity value, and the axis of abscissa represents segments. Each segment represented by a bar with slanting lines is an actual boundary of a scene (here, the segment is the top segment of a scene). In the result illustrated, if a segment at which the scene intensity value is equal to or higher than 12 is determined as a boundary of a scene, then the scenes coincide with actual scenes with the probability of 6/7.

A flow of operations described above is described with reference to FIG. 8. The flow of operations described here is performed by the scene detection section 16 of the video-audio processing apparatus, and the following processing is performed each time a segment is produced.

In step S11, the video-audio processing apparatus detects, for each segment, N neighboring similar segments within a range of ±k segments centered at the segment using the feature amount similarity measurement section 17 and determines the numbers of those similar segments which are present in the past and those similar elements which are present in the future.

In step S12, the number of those similar segments of the N similar segments determined by the processing in step S11 which are present in the past is subtracted from the number of those similar segments which are present in the future is determined as the boundary likelihood measurement value $F_i$ for each segment, and the boundary likelihood measurement values $F_i$ determined in this manner are stored.

In step S13, a place which is a boundary of a scene with a high possibility is specified from a variation of the pattern of the boundary likelihood measurement values $F_{i-n}, \ldots, F_i, F_{i+n}$ of 2n segments. n is the number of boundary likelihood measurement values sufficient to detect a pattern change between the ratio in the past and the ratio in the future from i segments.

Here, three requirements for a variation pattern which suggests a boundary of a scene are defined in the following manner:

(1) None of boundary likelihood measurement value of $F_{i-n}$ to $F_{i+n}$ is equal to 0;
(2) The values of $F_{i-n}$ to $F_{i-1}$ are all lower than 0; and
(3) The values of $F_{i-n}$ to $F_{i-1}$ are all higher than 0.

Then, it is discriminated whether or not all of the three requirements given above are satisfied. If all of the requirements are satisfied, then it is discriminated that the place is a boundary of a scene with a high possibility, and the processing advances to next step S14. In any other case, the processing advances to step S16.

In step S14, the boundary likelihood measurement values obtained in step S13 are applied to the following expression to calculate the scene intensity $V_i$ from the boundary likelihood measurement values $F_{i-n}, \ldots, F_i, \ldots, F_{i+n}$:

$$V_i = |F_{i-n}| + \ldots + |F_{i-1}| + |F_i| + \ldots + |F_{i+n}|$$

Then, if a requirement that a threshold value for an intensity value must be exceeded is provided, then if a scene intensity value which satisfies the requirement appears, then it is determined that it is an intensity of a visual change of the scene to be determined, and the position of the segment is outputted as one of boundaries of scenes of the video data being processed. Where the requirement regarding an intensity value is not required, the intensity value regarding each segment is outputted and recorded as additional information data to and into the video data recording section 18.

The processing described above is repeated to successively detect boundaries of scenes. A scene is formed from a group of segments included in a range from one to another one of the boundaries.

As described above, the video-audio processing apparatus to which the present invention is applied extracts a scene structure. It has been proved already through experiments that the series of processes of the video-audio processing apparatus described above can be applied to extract a scene structure from video data of various contents such as a television drama or a movie.

It is to be noted that, according to the present invention, the number of boundaries of scenes can be adjusted by arbitrarily changing the scene intensity value. Therefore, by adjusting the scene intensity value, boundary detection of a scene adapted better to various contents can be anticipated.

Further, in order to make it easy to look at videos at a glance, the number of scenes obtained can be made as small as possible. Therefore, where the number of detected scenes is limited, this gives rise to a new problem of which scenes should be shown. Thus, if the significance of each of the obtained scenes is known, then it is desirable to show the scenes in accordance with the order in significance. The present technique provides a scene intensity value which is a scale for measurement of to which degree an obtained scene is significant and thus allows the number of scenes to be changed by changing the scale (changing the scene intensity threshold value). Thus, the present invention provides a convenient representation for enjoyment in response to the interest of the user.

Besides, when the number of scenes is to be changed, it is not necessary to perform the scene detection process again, and the intensity value time series stored can be processed simply only by changing the scene intensity threshold value.

As described above, the present invention solves all problems of the prior art described hereinabove.

First, according to the video-audio processing apparatus, the user need not know a significance structure of video data in advance.

Further, the processing performed for each segment by the video-audio processing apparatus includes the following items:

(1) To extract a feature amount;
(2) To measure a dissimilarity between a pair of segments in a time area which includes a fixed number of segments;
(3) To use a result of the dissimilarity measurement to extract a fixed number of sufficiently similar segments;
(4) To calculate a measurement likelihood measurement value from a ratio of presence of similar segments; and
(5) To use the boundary likelihood measurement value to determine an intensity value of a scene boundary point.

The processes described have a low load upon calculation. Therefore, the processing can be applied to electronic apparatus for domestic use such as a set top box, a digital video recorder or a home server.

Further, the video-audio processing apparatus can provide, as a result of detection of a scene, a basis for a new high level access for video browsing. Therefore, the video-audio processing apparatus allows easy accessing to video data based on contents by visualizing the contents of the video data using a video structure of a high level not of a segment but of a scene. For example, where the video-audio processing apparatus displays a scene, the user can recognize a subject matter of the program rapidly and can find out a portion of the program which is interesting to the user.

Further, according to the video-audio processing apparatus, since a scene is detected, a basis for automatically producing an outline or an abstract of video data is obtained. Generally, in order to produce a consistent abstract, it is necessary not to combine random fractions from video data but to decompose video data into reproducible significant components. A scene detected by the video-audio processing apparatus provides a basis for production of such an abstract as just described.

It is to be noted that the present invention is not limited to the embodiment described above, and naturally, for example, the feature amounts for use for similarity measurement between segments and so forth may be different from those given hereinabove. Further, it is a matter of course that the embodiment described above can be modified suitably without departing from the spirit and scope of the present invention.

Furthermore, according to the present invention, a scene which is a significant changing point on a contents structure is obtained by arbitrarily changing the scene intensity value. This is because the intensity value can correspond to the degree of the variation of contents. In particular, when a video is to be accessed, the number of detection scenes can be controlled by adjusting the scene intensity threshold value. Besides, it is possible to increase or decrease the number of scenes, whose contents should be displayed, in accordance with an object.

In short, the so-called accessing granularity of contents can be controlled freely in accordance with an object. For example, when a video is to be enjoyed for a certain one hour, the intensity value is set to a high value first to show a short abstract including a scene or scenes which are significant for the contents. Then, if the user is more interested in and wants to see the contents more particularly, then the intensity value is lowered so that another abstract formed from a finer scene or scenes can be displayed. Besides, where the method of the present invention is applied, different from the prior art, detection need not be performed again each time the intensity value is adjusted, but only it is required to perform processing of a stored intensity value time series simply.

Further, where the video-audio processing apparatus is applied to domestic apparatus such as a set top box or a digital video recorder, the following advantages can be anticipated.

The first advantage is that, since scene detection of the present invention can be realized by investigating a local change of similar segments to each segment, the number of segments to be investigated can be fixed to a fixed number. Therefore, the memory capacity necessary for the processing can be fixed, and the video-audio processing apparatus can be incorporated also in an apparatus for domestic use such as a set top box or a digital recorder which has a comparatively small memory capacity.

The second advantage is that, as described above in the first advantage, the process for detecting a scene is realized by successively processing a predetermined number of segments. This allows real-time processing wherein the time required for each segment is fixed. This is suitable for an apparatus for domestic use such as a set top box or a digital recorder wherein a predetermined process must be completed without fail within a predetermined time.

The third advantage is that, since the processing for scene detection successively processes a predetermined number of segments for each segment as described hereinabove, sequential processing wherein processing for a new segment is performed each time the processing for one segment is completed is possible. This makes it possible to end, when recording of a video signal or the like is ended with an apparatus for domestic use such as a set top box or a digital recorder, the processing substantially simultaneously with the ending time of the recording. Further, even if the recording condition is stopped by some reason, it is possible to keep the record till then.

While the series of processes described above can be executed by hardware, it may otherwise be executed by software. Where the series of processes is executed by software, a program which constructs the software is installed from a recording medium into a computer incorporated in hardware for exclusive use or, for example, a personal computer for universal use which can execute various functions by installing various programs.

Figure 3:
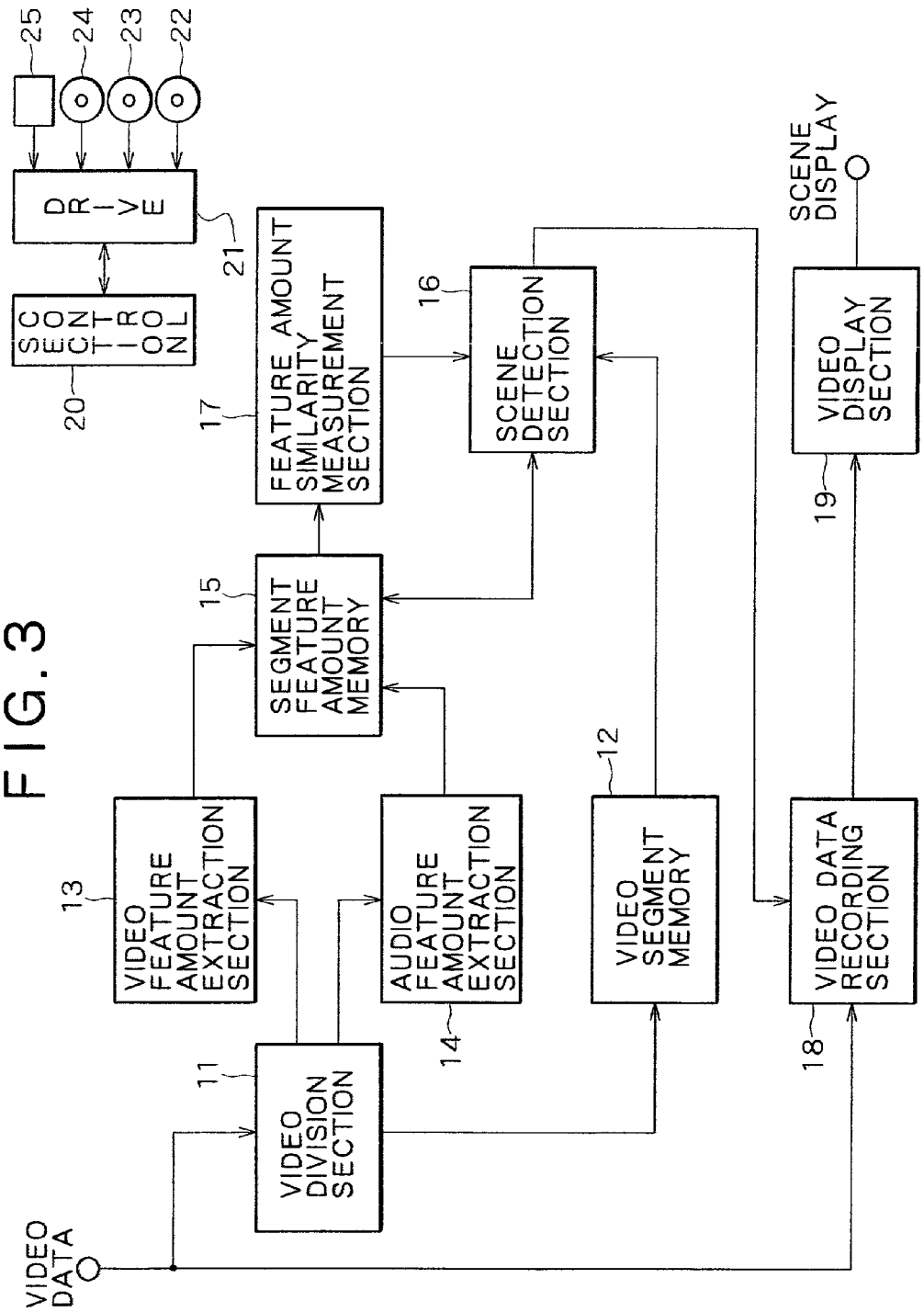
FIG. 3 is a block diagram showing a typical configuration of a video-audio processing apparatus to which the present invention is applied.

The recording medium may be formed as a package medium such as, as shown in FIG. 3, a magnetic disk 22 (including a floppy disk), an optical disk 23 (including a CD-ROM (Compact Disc-Read Only Memory) and a DVD (Digital Versatile Disk)), a magneto-optical disk 43 (including an MD (Mini-Disc)), or a semiconductor memory 25 which has the program recorded thereon or therein and is distributed in order to provide the program to a user separately from a computer, or as a ROM or a hard disk which has the program recorded therein or thereon and is provided to a user in a form wherein it is incorporated in a computer.

It is to be noted that, in the present specification, the steps which describe the program recorded in or on a recording medium may be but need not necessarily be processed in a time series in the order as described, and include processes which are executed parallelly or individually without being processed in a time series.

Further, in the present specification, the term "system" is used to represent an entire apparatus composed of a plurality of apparatus.

While a preferred embodiment of the invention has been described using specific terms, such description is for illustrative purposes only, and it is to be understood that changes and variations may be made without departing from the spirit or scope of the following claims.

What is claimed is:

1. An AV signal processing apparatus for detecting a boundary between scenes, comprising: feature amount extraction means for extracting feature amounts of segments each formed from a series of frames which form an AV signal; similarity measurement means for measuring a similarity between a segment and other segments in a predetermined time domain between the past and the future using said feature amounts; similar segments detection means for detecting similar segments according to said similarity for each segment in said predetermined time domain; similar segments counting means for counting said similar segments in said past and said future in said predetermined time domain for each segment; boundary likelihood measurement calculation means for calculating boundary likelihood measurement value according to a counted amount of said similar segments in said predetermined time domain for each segment; pattern detection means for detecting a pattern of existence of said boundary likelihood measurement values in said predetermined time domain; boundary discrimination means for discriminating a boundary of a scene according to said pattern; and scene intensity value calculation means for calculating a scene intensity value from a total of the absolute values of said boundary likelihood measurement values of at least four segments including a present segment for each segment;

wherein said boundary discrimination means discriminates a boundary of a scene according to said scene intensity value which reaches a predetermined value.

2. An AV signal processing method for an AV signal processing apparatus for detecting a boundary between scenes, comprising the steps of:

extracting feature amounts of segments each formed from a series of frames which form said AV signal;

measuring a similarity between a segment and other segments in a predetermined time domain between the past and the future using said feature amounts;

detecting similar segments according to said similarity for each segment in said predetermined time domain;

counting said similar segments in said past and said future in said predetermined time domain for each segment;

calculating boundary likelihood measurement value according to said amount of said similar segments in said predetermined time domain for each segment;

detecting a pattern of existence of said boundary likelihood measurement values in said predetermined time domain;

calculating a scene intensity value from total of the absolute values of said boundary likelihood measurement values of at least four segments including a present segment for each segment; and discriminating a boundary of a scene according to said pattern and said scene intensity value which reaches a predetermined value.

3. A recording medium on which a computer readable program for AV signal processing for detecting a boundary between scenes is recorded, the program comprising:

extracting feature amounts of segments each formed from a series of frames which form said AV signal;

measuring a similarity between a segment and other segments in a predetermined time domain between the past and the future using said feature amounts;

detecting similar segments according to said similarity for each segment in said predetermined time domain;

counting said similar segments in said past and said future in said predetermined time domain for each segment;

calculating boundary likelihood measurement value according to said amount of said similar segments in said predetermined time domain for each segment;

detecting a pattern of existence of said boundary likelihood measurement values in said predetermined time domain;

calculating a scene intensity value from total of the absolute values of said boundary likelihood measurement values of at least four segments including a present segment for each segment; and discriminating a boundary of a scene according to said pattern and said scene intensity value which reaches a predetermined value.

* * * * *